United States Patent

Sherman, Jr.

[15] 3,644,832

[45] Feb. 22, 1972

[54] POWER CONTROL CIRCUIT

[72] Inventor: Ralph R. Sherman, Jr., Forest, Va.

[73] Assignee: General Electric Company

[22] Filed: Sept. 28, 1970

[21] Appl. No.: 76,374

[52] U.S. Cl. .............................. 325/186, 325/159, 325/151, 328/9, 330/29

[51] Int. Cl. ...................... H04b 1/04, H02h 7/20, H03g 3/30

[58] Field of Search ...................... 325/64, 62, 147, 151, 159, 325/186; 328/9; 330/29; 178/7.1

[56] References Cited

UNITED STATES PATENTS 3,281,697 10/1966 Hansen et al. .......................... 325/151

3,323,065 5/1967 O'Connor .............................. 325/151

*Primary Examiner*—Richard Murray
*Assistant Examiner*—John C. Martin
*Attorney*—James J. Williams, Frank L. Neuhauser, Oscar B. Waddell and Joseph B. Forman

[57] ABSTRACT

The output power produced by a radio transmitter is maintained at a more nearly constant level by a control circuit that senses the current supplied to the output stage of the transmitter, and that supplies current to a preceding driver stage of the transmitter as an inverse function of the output current.

3 Claims, 2 Drawing Figures

INVENTOR:
RALPH R. SHERMAN, JR.

BY James J. Williams
HIS ATTORNEY.

POWER CONTROL CIRCUIT

BACKGROUND OF THE INVENTION

My invention relates to an improved power control circuit for a radio transmitter, and particularly to such a control circuit for a radio transmitter that uses transistors which are not operated in a saturated condition at all times.

In the design of radio transmitters, it has been a common practice to provide a saturated operating condition for each of the transmitter amplifier stages, or at least for the last several of such stages. This is done to reduce the effects of varying stage gains and to provide improved output power stability, particularly when the supply voltage to the transmitter varies. If the transmitter utilizes vacuum tubes, it is fairly easy to operate the tubes in a saturated condition, even in the final amplifier stage, and thus provide a transmitter that meets the necessary operating conditions and legal requirements. However, if the transmitter utilizes solid-state devices, such as transportation, it has proven to be more difficult to maintain these devices in a saturated condition. And, where it has not been possible to maintain the solid-state devices in a saturated condition, the power output and the current drain of the transmitter are related to or vary as a function of the quality of the solid-state devices which are used. Accordingly, some type of control circuit or arrangement is needed for a transmitter that uses conventional solid-state devices, such as transistors, so that the transmitter will have the desired and stable output power and current drain.

Accordingly, an object of my invention is to provide a new and improved transmitter power control circuit.

Another object of my invention is to provide a new and improved control circuit that maintains the output power of a radio transmitter at a substantially constant level, even though the transmitter uses transistors that operate in an unsaturated state and that are not carefully matched for the particular circuit conditions.

SUMMARY OF THE INVENTION

Briefly, these and other objects are achieved in accordance with my invention by a power control circuit having a current-sensing circuit that senses the current drawn or utilized by the output transistor of a radio transmitter. This current-sensing circuit produces a voltage which is applied to my control circuit so as to control the current supplied to a preceding driver transistor in the transmitter. The control circuit uses inverse or negative feedback, so that if the output transistor draws an excessive amount of current, the current supplied to the preceding driver transistor is reduced so as to reduce the output current. Conversely, if the current drawn by the output transistor is deficient, the current supplied to the preceding driver stage is increased so as to increase the output current. Thus, output current is held within a desired range or tolerance, even though the various transistors in the radio transmitter are not operated in a saturated condition and are not matched or carefully selected.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
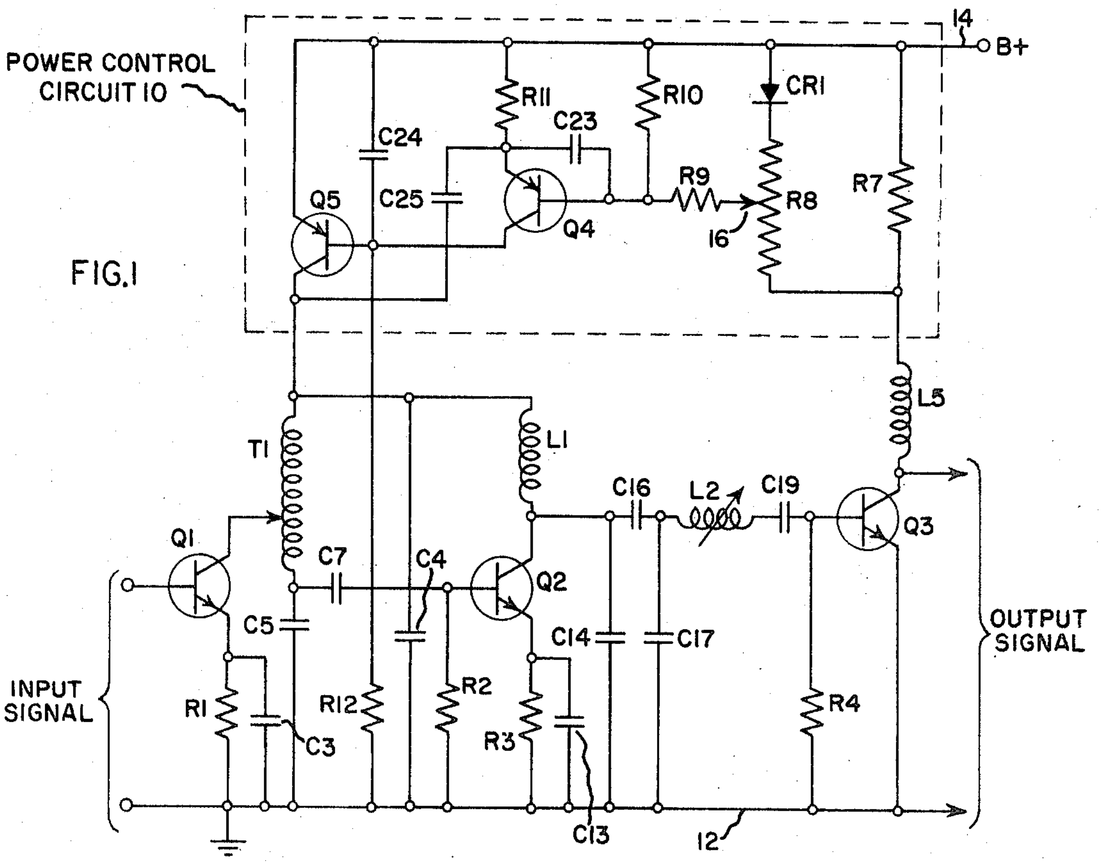
FIG. 1 shows a schematic diagram of a preferred embodiment of a power control circuit in accordance with my invention.

In FIG. 1, I have shown a schematic diagram of a preferred embodiment of a power control circuit 10 in accordance with my invention. My circuit 10 is enclosed in dashed lines to separate it from the remainder of a circuit which, by way of example only, may be the driver and output stages of a radio transmitter. This transmitter may have various forms, and in FIG. 1 I have assumed that modulated input signals are applied to an NPN-type driver transistor Q1. The output of the transistor Q1 is applied to a transformer T1, and coupled through a capacitor C7 to an NPN-type amplifier transistor Q2. The output from the transistor Q2 is coupled through a suitable frequency-selective network, comprising three capacitors C16, C17, C19 and an inductor L2 to an NPN-type output power transistor Q3. Output signals are derived from the collector of the power transistor Q3 as indicated. Other circuit elements are provided in the transmitter, but since the transmitter forms no part of my invention and may have various arrangements known to persons skilled in the art, these circuit elements will not be described. The transmitter or circuit shown in FIG. 1 operates with respect to a point of reference potential or a ground bus 12, and is supplied with a suitable source of direct current voltage (B+) which is connected to a positive bus 14. The current supplied to the driver transistors Q1, Q2 and the output transistor Q3 is controlled by my power control circuit 10 so as to maintain the transmitter output signal at the desired power level.

My control circuit 10 comprises a current-sensing circuit having a serially connected diode rectifier CR1 and a resistor R8, and a fixed resistor R7 connected in parallel with the rectifier CR1 and the resistor R8. The rectifier CR1 provides temperature compensation, and the resistor R7 provides a current shunt path to prevent excessive current flow through the rectifier CR1. This current-sensing circuit is connected between the positive bus 14 and a filter inductor 15, which in turn is connected to the collector of the output power transistor Q3. The current drawn by the transistor Q3 causes the voltage at a variable tap 16 (on the resistor R8) to vary inversely with the current drawn. Thus, as more current is drawn by the transistor Q3, the voltage at the tap 16 becomes lower or less positive; and as less current is drawn by the transistor Q3; the voltage at the tap 16 becomes higher or more positive. This voltage is coupled through a resistor R9 to the base of a PNP-type transistor Q4. The emitter of the transistor Q4 is connected to the positive bus 14 through a resistor R11, and the base of the transistor Q4 is connected to the positive bus 14 through a bias resistor R10. A capacitor C23 is connected between the emitter and base of the transistor Q4 for the purpose of bypassing radio frequency signal voltage from the transmitter. The collector of the transistor Q4 is coupled directly to the base of a PNP-type transistor Q5. The emitter of the transistor Q5 is connected directly to the positive bus 14, and the collector of the transistor Q5 is connected through the transformer T1 and its tap so as to supply current to the driver transistor Q1 in the transmitter, and through the inductor L1 to supply current to the transistor Q2. A capacitor C25 is connected between the emitter of the transistor Q4 and the collector of the transistor Q5. This capacitor C25, along with the resistor R11, provides alternating current negative feedback so as to reduce the high frequency gain of the control circuit and eliminate instabilities when used with the radio transmitter. A capacitor C24 connecting the emitter and base of the transistor Q5 provides the same stability function. A resistor R12 is connected between the base of the transistor Q5 and the ground bus 12 for the purpose of supplying bias to the transistor Q5.

When the control circuit 10 is connected to a circuit such as the transmitter shown in FIG. 1, the tap 16 is set on the resistor R8 at a selected point which causes the output transistor Q3 to provide the desired output current. If, for some reason, the output transistor Q3 draws an additional amount of current, this causes the voltage at the tap 16 to become less positive which, in turn, causes the transistor Q4 to conduct additional emittertcollector current. This causes the collector of the transistor Q4 and the base of the transistor Q5 to become more positive so that the transistor Q5 conducts less current in its emitter-collector path. This reduces the current supplied to the transmitter driver transistors Q1, Q2, with the result that the current drawn by the output transistor Q3 is reduced back to the desired level. Conversely, if the transistor Q3 draws less than the desired current, the voltage at the tap 16 becomes more positive. This causes the transistor Q4 in the control circuit 10 to conduct less current, so that its collector and the base of the transistor Q5 become less positive. The transistor Q5 thus draws more current through its emitter-collector path so that the driver transistors Q1, Q2 receive more current and causes the output transistor Q3 to draw more current and thus maintain the output current at the desired level.

Figure 2:
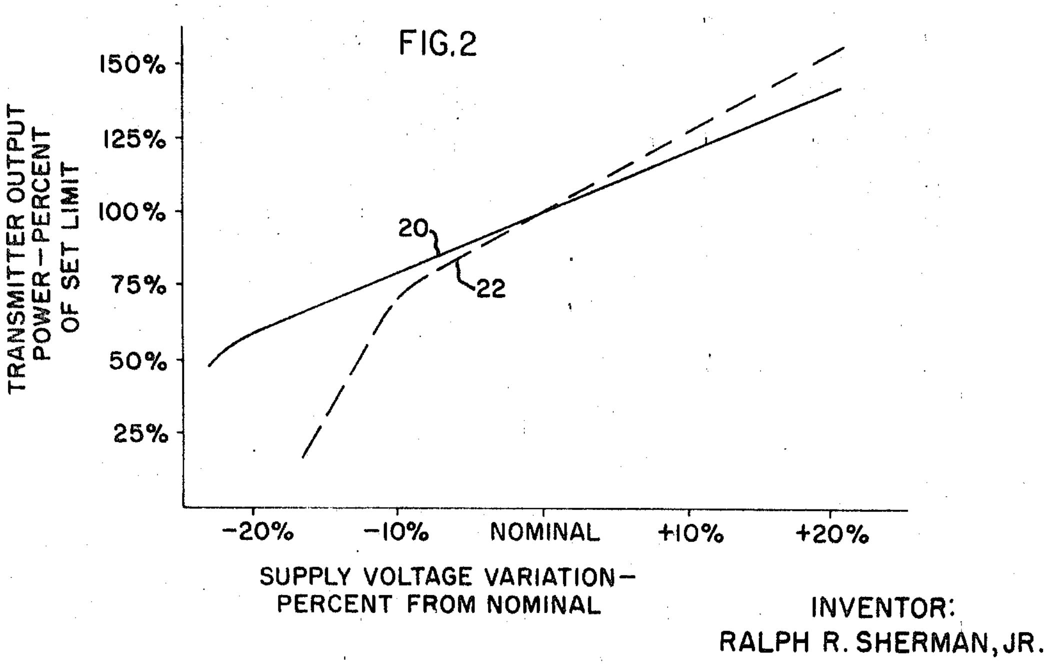
FIG. 2 shows graphs illustrating the improved operation of my power control circuit as compared with a previously known control circuit.

FIG. 2 shows a solid line graph 20 illustrating the improved performance obtained for a radio transmitter when operated with the control circuit 10 in accordance with my invention, and a dashed line graph 22 illustrating the performance obtained for the same transmitter when operated with a previously known control circuit. In FIG. 2, the horizontal or X-axis represents variations of the supply voltage in percent from nominal or normal value, and the vertical or Y-axis indicates the transmitter output power with respect to a normal output power level of 100 percent. It will be seen that the solid line graph 20 is more horizontal than the dashed line graph 22, showing that the transmitter output power varies less when operated with my control circuit than when operated with a previously known control device. For example, if the supply voltage exceeds the nominal value by +10 percent, my control circuit maintains the output power within approximately 120 percent, whereas the previous control device permitted the output power to increase to 130 percent. Even better results are obtained on the lower side of the nominal supply voltage value.

It will thus be seen that my invention provides a new and improved control circuit, particularly for use in radio transmitters having transistors which are not operated under saturated conditions. My circuit provides improved operation because it maintains the necessary current at the level needed to produce the desired power output, despite variations in the transmitter conditions. And, my circuit can, as illustrated by FIG. 2, maintain this power output within acceptable limits despite variations in the supply voltage as high as plus or minus 20 percent from its normal value. Also, my circuit protects the final or output power transistor in that it limits the amount of current which can be drawn by the output transistor. While I have shown only one embodiment of my control circuit, persons skilled in the art will appreciate that modifications may be made. For example, the PNP-type transistors Q4, Q5 may be replaced by NPN-type transistors. Likewise, the temperature-compensating rectifier CR1 may be omitted, although it is preferred. The resistor R7 may also be omitted, although I prefer it because it reduces the current flow required through the temperature compensating diode CR1. Additional features and advantages of my circuit will also be recognized by persons skilled in the art. Therefore, while my invention has been described with reference to a particular embodiment, it is to be understood that modifications may be made without departing from the spirit of the invention or from the scope of the claims.

What I claim as new and desire to secure by Letters Patent of the United States is:

1. A control circuit for controlling the output power of a radio transmitter having an input solid-state current control device and an output solid-state current control device, said control circuit maintaining said output power at a substantially constant value despite variations in circuit conditions and comprising:

a. a bus for connection to a source of direct current potential;

b. a current-sensing circuit connected between said bus and the output current control device of a transmitter for supplying current thereto, said current-sensing circuit having an output circuit that produces a voltage whose magnitude varies as a function of the current drawn by said output current control device;

c. a first transistor having an emitter-collector path and a base;

d. a second transistor having an emitter-collector path and a base;

e. means connecting said base of said first transistor to said current-sensing output circuit;

f. a resistor connected between one side of said emitter-collector path of said first transistor and said bus;

g. means connecting one side of said emitter-collector path of said second transistor to said bus;

h. means connecting said base of said second transistor to the other side of said emitter-collector path of said first transistor;

i. a capacitor connected between the other side of said emitter-collector path of said second transistor and said one side of said emitter-collector path of said first transistor;

j. a capacitor connected between said one side of said emitter-collector path of said second transistor and said base of said second transistor;

k. a resistor connected between said base of said second transistor and a point of reference potential;

l. and means connecting said other side of said emitter-collector path of said second transistor to the input current control device of said transmitter for supplying current to said input current control device from said bus and through said emitter-collector path of said second transistor.

2. The control circuit of claim 1 wherein said transistors comprise PNP-type transistors whose emitters respectively form said one sides of said emitter-collector paths, and whose collectors respectively form said other sides of said emitter-collector paths.

3. The control circuit of claim 1 wherein said transistors comprise NPN-type transistors whose collectors respectively form said one sides of said emitter-collector paths, and whose emitters respectively form said other sides of said emitter-collector paths.

* * * * *

UNITED STATES PATENT OFFICE
CERTIFICATE OF CORRECTION

Patent No. 3,644,832 Dated February 22, 1972

Inventor(s) Ralph R. Sherman, Jr.

It is certified that error appears in the above-identified patent and that said Letters Patent are hereby corrected as shown below:

Column 1, line 20, change "transportation" to -- transistors --

Column 3, line 2, change "emittertcollector" to -- emitter-collector --

Signed and sealed this 9th day of January 1973.

(SEAL)
Attest:

EDWARD M.FLETCHER,JR.
Attesting Officer

ROBERT GOTTSCHALK
Commissioner of Patents